United States Patent [19]
Bechade

[11] Patent Number: 5,283,755
[45] Date of Patent: Feb. 1, 1994

[54] MULTIPLIER EMPLOYING CARRY SELECT OR CARRY LOOK-AHEAD ADDERS IN HIERARCHICAL TREE CONFIGURATION

[75] Inventor: Roland A. Bechade, So. Burlington, Vt.

[73] Assignee: International Business Machines Corporation, Armonk, N.Y.

[21] Appl. No.: 48,396

[22] Filed: Apr. 14, 1993

[51] Int. Cl.$^5$ ............................................... G06F 7/52
[52] U.S. Cl. ....................................... 364/757; 364/758
[58] Field of Search ................. 364/757, 758, 759, 760

[56] References Cited

U.S. PATENT DOCUMENTS

| | | | |
|---|---|---|---|
| 3,752,971 | 8/1973 | Calhoun et al. | 235/164 |
| 3,900,724 | 8/1975 | McIver et al. | 235/164 |
| 4,369,500 | 1/1983 | Fette | 364/758 |
| 4,727,507 | 2/1988 | Miyanaga | 364/760 |
| 4,748,583 | 5/1988 | Noll | 364/758 |
| 4,752,905 | 6/1988 | Nakagawa et al. | 364/760 |
| 4,799,183 | 1/1989 | Nakano et al. | 364/760 |
| 4,910,701 | 3/1990 | Gibbons et al. | 364/760 |
| 4,982,355 | 1/1991 | Nishimura et al. | 364/758 |
| 4,982,357 | 1/1991 | Bechade | 364/788 |

FOREIGN PATENT DOCUMENTS

| | | |
|---|---|---|
| 60-83140 | 5/1985 | Japan. |
| 61-177543 | 8/1986 | Japan. |
| 62-97033 | 5/1987 | Japan. |

OTHER PUBLICATIONS

Gosling, John B., "Design of Arithmetic Units for Digital Computers", pp. 8-14, 1980.
Habibi and Wintz, "Fast Multiplier" IEEE Transaction on Computer, pp. 154-157, Feb. 1970.

Primary Examiner—Tan V. Mai
Attorney, Agent, or Firm—Heslin & Rothenberg

[57] ABSTRACT

A multiplication circuit for a floating point digital processing system includes a partial products generator and a carry adder circuit for determining a product resulting from multiplication of an M bit multiplicand and an N bit multiplier. The partial products generator outputs to the carry adder circuit partial products based on the M bit multiplicand and N bit multiplier. The carry adder circuit contains a plurality of carry adders connected in a hierarchical tree structure such that a plurality of carry adder stages are defined, with each carry adder stage except a first carry adder stage receiving adder sums from a next adjacent, lower carry adder stage in the hierarchical tree structure. The first carry adder stage receives the partial products output from the partial products generator. The multiplication circuit is optimized by employing carry select adders or carry look-ahead adders in the hierarchical tree structure.

26 Claims, 4 Drawing Sheets

MULTIPLIER EMPLOYING CARRY SELECT OR CARRY LOOK-AHEAD ADDERS IN HIERARCHICAL TREE CONFIGURATION

TECHNICAL FIELD

The present invention relates in general to a hardware multiplier for a computer system, and more particularly, to a binary multiplier employing regular carry select adders or carry look-ahead adders in a hierarchical tree configuration which can be readily constituted in the form of an integrated circuit.

BACKGROUND ART

As computer programming becomes more sophisticated ever greater performance demands are placed upon basic logic combinational networks such as adders, multipliers, and the like. In general, these demands have been met by utilizing state-of-the-art transistor processing techniques to reduce switching delays. However, as the number of bits to be logically synthesized increases, this solution becomes inadequate. Accordingly, renewed emphasis is being placed on the design of these basic logic networks.

Hardware multiplication is generally used in digital signal and data processing systems to perform high speed binary multiplication. Multiplication of binary numbers is conducted in essentially the same way as decimal number multiplication. For every bit in one of the factors (the multiplier) a multiple is formed of the other factor (the multiplicand) and is added to a running total. Successive partial products are shifted one position to the left with the final product being obtained from the sum of the partial products. If the whole operation is to be conducted simultaneously by a fast multiplier, then one adder is needed for every digit in the multiplier.

A large number of combinational logic multipliers now exist which are capable of high speed multiplication. Most, if not all, of these multiplication circuits employ carry save adders (or a variation thereof) connected branchwise to add (to the extent possible) partial products in parallel. By way of example, consider a conventional carry save multiplier, Dadda multiplier, Wallace tree multiplier or binary tree multiplier, all of which are well known in the open literature and all of which employ carry save adders connected in multiple stages and coupled to receive partial products and output based thereon a binary number comprising the desired product of the input factors (see, e.g., Habibi and Wintz, "Fast Multiplier," IEEE Transaction on Computers, pp. 154–157 (February 1970)).

Perhaps the most widely used hardware multiplier approach today is the Wallace tree multiplier. This multiplier requires complex interconnections of carry save adders to enhance performance summation within each column of the array multiplier. Although successful in enhancing performance, the Wallace tree multiplier is difficult to implement, often requiring wiring by hand (which is obviously time consuming and inflexible), and results in a very irregular structure that is hard to diagnose. Further, to optimize performance, interconnections must be carefully planned in order to minimize stray capacitance.

Thus, a need exists in the computer system art for a novel combinatorial logic approach comprising a less complex, high speed binary multiplier. The present invention addresses this need by employing a plurality of regular carry select adders or carry look-ahead adders in a novel binary multiplication array structure having a hierarchical tree configuration.

DISCLOSURE OF INVENTION

Briefly summarized, this invention comprises in one aspect a multiplier circuit for determining the product of an M bit multiplicand and an N bit multiplier given partial products thereof. The multiplier circuit includes a plurality of adders connected in a binary tree structure such that multiple adder stages are defined. Each adder outputs a sum and a carry, with the number of bits in each adder equalling the number of bits M in the M bit multiplicand and the number of adders in the hierarchical tree structure equalling the number of bits N in the N bit multiplier. A first adder stage receives pairs of partial products of the M bit multiplicand and the N bit multiplier, with the partial products of each partial product pairing being offset one bit position. A final adder stage is coupled to the first adder stage and is connected to receive carrys from all adders in the remaining stages of the hierarchical tree structure. The sum and the carry output from the final stage adder comprise a portion of the product resulting from multiplication of the M bit multiplicand and the N bit multiplier.

In another aspect, the invention comprises a binary multiplier circuit for determining a product of an M bit multiplicand and an N bit multiplier given partial products thereof. An array of adders is presented in a binary tree configuration to complete the desired multiplication. A first adder stage of the array of adders collects, in pairs, most of partial products of the M bit multiplicand and N bit multiplier. The partial products within each pairing are offset one bit position. A second adder stage is connected to the output of the first adder stage such that each adder of the second adder stage receives sums from two corresponding adders of the first adder stage. The sums received by each adder of the second adder stage are offset two bit positions. At least one of the adders of the second adder stage also receives an uncollected partial product of the M bit multiplicand and N bit multiplier. A final adder stage is coupled to the second adder stage and outputs a portion of the product resulting from multiplication of the M bit multiplicand and the N bit multiplier. The first adder stage and the second adder stage also each output at least one bit of the resultant product.

As a further aspect, a multiplication circuit is presented for high speed multiplication in a computer system. The circuit includes a partial products generator and a carry adder circuit. The partial products generator receives a binary multiplicand and a binary multiplier and produces partial products based thereon. The carry adder circuit has a plurality of carry adders, each of which produces a sum and a carry, connected to receive the partial products output from the partial products generator. The carry adder circuit comprises a hierarchical tree structure having multiple carry adder stages. Each carry adder stage (except a first adder stage) receives sums from a next adjacent, lower carry adder stage in the hierarchical tree structure. The first carry adder stage receives most of the partial products output from the partial products generator. Preferably, each adder of the carry adder circuit comprises a carry select adder or each adder comprises a carry look-ahead adder.

Additional details of the above-summarized aspects of the invention are presented and claimed herein. In all embodiments, a hardware multiplier pursuant to the present invention consists of a simple array configuration which is suitable for automated design and can be readily constituted in the form of an integrated circuit. The multiplier can be built with two building blocks: (1) a novel adder circuit arranged in a hierarchical tree structure; and (2) a two-word partial products generator. Optimally, each adder comprises a carry select adder or a carry look-ahead adder. A hardware multiplier pursuant to the present invention is as fast as a full Wallace tree multiplier, allowing single cycle multiply operations, but much simpler in design and to construct.

BRIEF DESCRIPTION OF DRAWINGS

These and other objects, advantages and features of the present invention will be more readily understood from the following detailed description of certain preferred embodiments thereof, when considered in conjunction with the accompanying drawings in which.

BEST MODE FOR CARRYING OUT THE INVENTION

Figure 1:
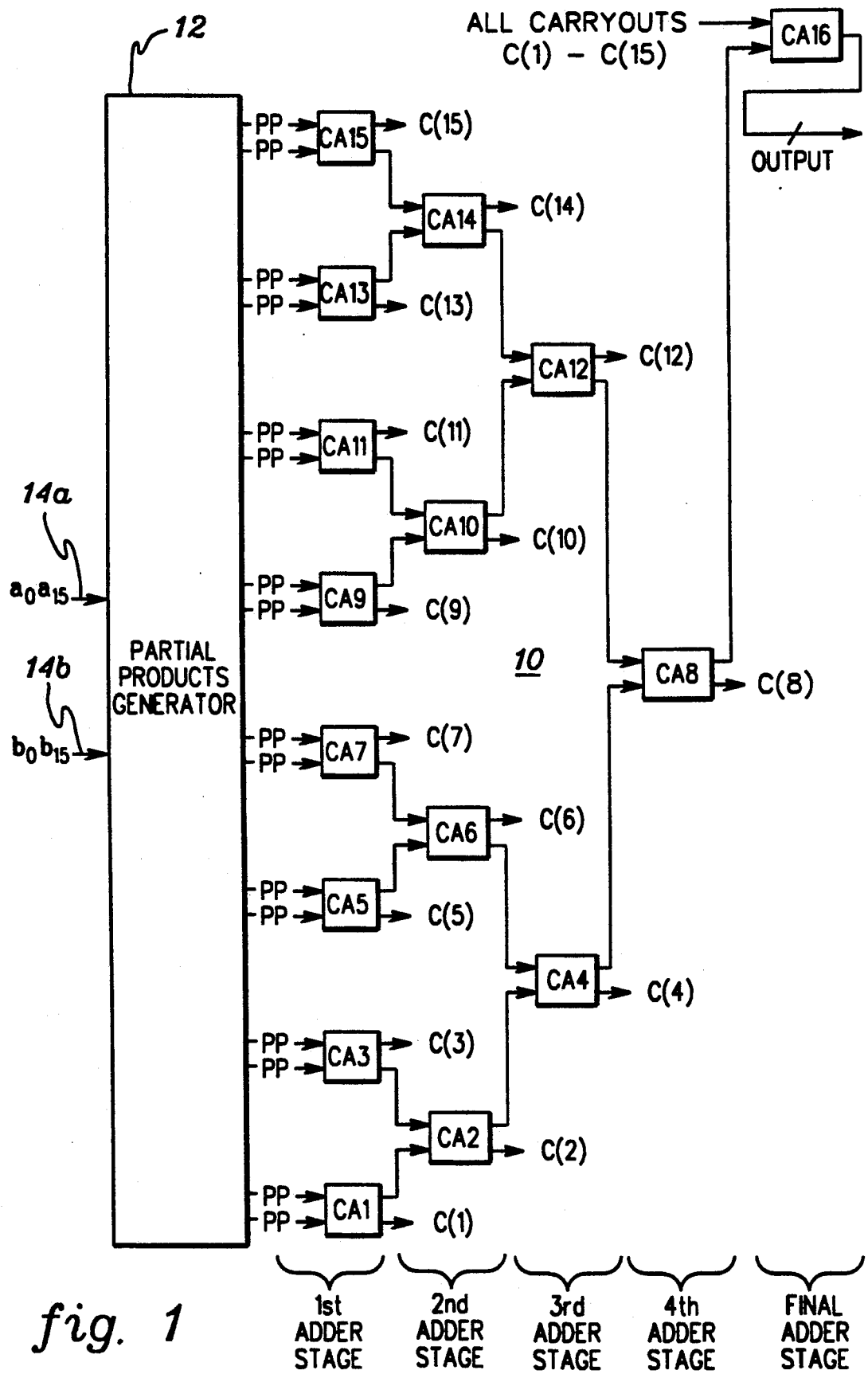
FIG. 1 is a block diagram of an array multiplication circuit pursuant to the present invention wherein multiple adder stages are connected in a hierarchical tree structure.
Figure 2:
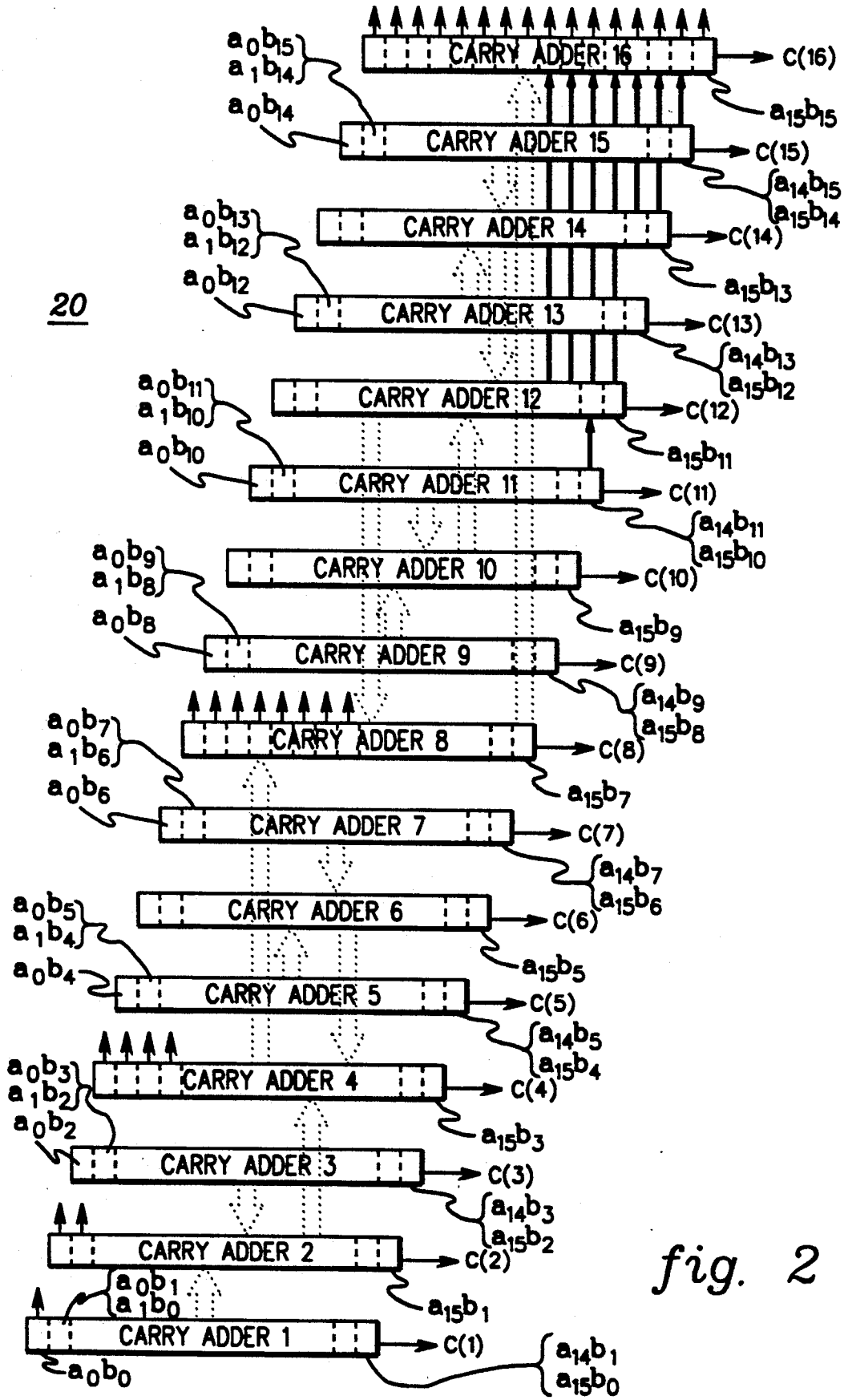
FIG. 2 is an example of a 16×16 multiplication array pursuant to the present invention wherein the adders, connected in the hierarchical tree structure of FIG. 1, are each offset one bit position from adjacent adders.

A detailed embodiment of a hardware multiplier laid out in accordance with the present invention is shown in FIGS. 1 and 2. The multiplier, which is designed for a floating point digital signal processor, employs state-of-the-art adders in a unique hardware configuration. The circuit is optimized by using carry select adders or carry look-ahead adders. One embodiment of a carry select adder which is preferred in conjunction with the present invention is presented in commonly assigned U.S. Pat. No. 4,982,357 entitled "Plural Dummy Select Chain Logic Synthesis Network," by R. Bechade, the entirety of which is hereby incorporated herein.

Refer first to FIG. 1, wherein a block diagram pursuant to the present invention of a 16×16 multiplier, generally denoted 10, is shown. Multiplier 10 includes a conventional two-input partial products generator 12 which receives at a first input 14a an N bit multiplier factor $a_0$-$a_{N-1}$ at a second input 14b an M bit multiplicand $b_0$-$b_{M-1}$ (note that in this example N=M=16). Output from generator 12 are partial products (PP) $a_0b_0, a_0b_1, a_1b_0 ... a_{15}b_{15}$. The number of carry adders in the hierarchical tree structure (discussed below) equals the number of bits N in the N bit multiplier at input 14a to generator 12, while the number of bits within each adder equals the number of bits M in the M bit multiplicand at input 14b to generator 12. At least two adder stages are needed for a hierarchical tree structure, with five stages being shown in FIGS. 1 and 2 for the 16×16 multiplier. (Again, this multiplier is provided by way of example only.) Further, the number of bits N in the multiplier and the number of bits M in the multiplicand need not be equal to implement a multiplication circuit in accordance with the present invention.

Assuming that the array of carry adders are laid out in a stack configuration (see FIG. 2) with each carry adder of the stack being offset one bit position relative to its next adjacent carry adders, then a first adder stage includes every other carry adder (CA) (i.e., CA1, CA3, CA5, CA7, CA9, CA11, CA13 and CA15). Each carry adder of the first adder stage outputs a sum (on the interconnecting buses shown in phantom in FIG. 2) and a carry (C(1), C(3), C(5), C(7), C(9), C(11), C(13) and C(15)). Pursuant to the present invention, the carry signals are sent to a final adder stage (which in a 16×16 multiplier comprises the 16th carry adder (CA16)), where the carrys are added together.

The hierarchical tree structure is best shown in FIG. 1. Consider, for example, that the sums from a first pairing of carry adders, i.e., "carry adder 1" (CA1) and "carry adder 3" (CA3) of the first adder stage are forwarded to "carry adder 2" (CA2) of the second adder stage. Similarly, the sums from the remaining carry adder pairings comprising the first adder stage are respectively forwarded to "carry adder 6" (CA6), "carry adder 10" (CA10) and "carry adder 14" (CA14) of the second adder stage. The particular adder to receive the sums of a previous stage adder pairing is a matter of design convenience. The sums from second stage adders CA2 and CA6 are also similarly paired and added in a third stage adder CA4, while sums from second stage adders CA10 and CA14 are paired and added in another third stage adder CA12. As with the first adder stage, the second adder stage and third adder stage carrys (C(2), C(6), C(10), C(14), C(4) and C(12)) are forwarded to final adder stage CA16 for adding. A fourth adder stage adder CA8 receives sums from third adder stage adders CA4 and CA12. The eight bits not comprising direct output (discussed below) are fed from fourth stage adder CA8 to final adder stage CA16 where they are combined with carrys C(1)-C(15) from adders CA1-CA15. The resulting multiplier delay is represented by the combination of five times the delay of the output of an adder in the first adder stage and eight times the group select delay. (Today, a "group" of bits within a carry select adder typically comprises four bits.)

A more detailed embodiment of the adder array, denoted 20, for the 16×16 multiplier pursuant the present invention is shown in FIG. 2. As can be ascertained from the interconnecting bus layout (shown in phantom) multiplier array 20 is configured in the same hierarchical tree structure of FIG. 1. (The partial products generator is not shown.) Selected partial products are fed past the adders of the first adder stage (CA1, CA3, CA5, CA7, CA9, CA11, CA13 and CA15) to adders in the second adder stage, third adder stage and/or fourth adder stage since not all partial products can be accounted for by the adders of the first adder stage. This is because of the needed one bit offset between adders in the stack. The 32 outputs (identified as dark vertical arrows) from multiplier array 20 originate with different adders in the tree structure. The lower order bits come from "carry adder 1" (1 bit), "carry adder 2" (2 bits), "carry adder 4" (4 bits) and "carry adder 8" (8 bits), while the remaining 16 bits are output from "carry adder 16". (The correct weight of each bit position is maintained throughout the different levels of addition.)

More specifically, refer to the first adder stage wherein almost all partial products having a $b_1$ or $b_0$ component are added in "carry adder 1" simultaneous with the adding of partial products having components $b_3$ or $b_2$ in "carry adder 3". Together the output sums are collected in "carry adder 2" of the second adder stage. (Compare this with the hierarchical tree structure of FIG. 1.) Because each adder receives pairs of partial products offset by one bit, partial product $a_{15}b_1$ is unable to be added in "carry adder 1". Therefore, this partial product is forwarded to "carry adder 2" of the second adder stage for collecting. Similarly, partial product $a_{15}b_3$ is unable to be added at "carry adder 3" so this partial product is forwarded to "carry adder 4" of the third adder stage (which has an extra bit that can handle the partial product summation). Analogous partial product summations and direct transfers also occur between the remaining adders of the first adder stage and the adders of the second adder stage, third adder stage, fourth adder stage and final adder stage. Thus, although essentially all partial products are handled simultaneously by the adders of the first adder stage, eight partial products are collected (one partial product each) in the adders of the remaining adder stages.

Continuing with the hierarchical tree structure (again, shown by the phantom arrows), sums from second stage adders "carry adder 2" and "carry adder 6" are input to the third adder stage at "carry adder 4", while second adder stage "carry adder 10" and "carry adder 14" sums are presented to third adder stage "carry adder 12". Next, the sums from "carry adder 4" and "carry adder 12" of the third adder stage are presented to the fourth adder stage "carry adder 8".

As already noted, the lowermost bits from "carry adder 8" comprise a portion of the resultant 32 bit product, while the remaining eight bits are transferred to "carry adder 16" for summation with carrys $C(1)-C(15)$ output from "carry adder 1" through "carry adder 15". In addition, the rightmost bit of "carry adder 15" of the first adder stage is fed to "carry adder 16" since its respective adder of the second adder stage ("carry adder 14") cannot accommodate the final sum bit. Similarly, in view of the one bit offset between the second adder stage and third adder stage, the two rightmost sum bits from "carry adder 14" are fed to "carry adder 16" and because of the bit offset between the third adder stage and fourth adder stage, the four rightmost sum bits from "carry adder 12" are fed to "carry adder 16". (The rightmost bit of "carry adder 11" is collected at "carry adder 12".) An analogous transfer of sums to "carry adder 8" occurs among the adders comprising the lower half of the adder stack shown in FIG. 2.

Those skilled in the art will recognize that the circuit design presented herein can be logically implemented in a very short time and assembled on chip using basic stack placement and wiring programs. Although, the multiplier is not optimized to the extent of a Wallace tree, the design is much easier to implement. More particularly, the multiplier's first adder stage and second adder stage are not optimized. Indeed, because of the bit shifting boundary between the adds it is necessary to wait for the fourth bit to be ready before proceeding to the next addition. (To determine the critical delay, actual data bits do not have to be gated.) This is apparent in the delay equation where eight group delays are added, while the optimum delay would have to add only six group delays. Considerable advances in the performance and density of adders have mitigated these considerations. The last three adder stages are optimized, however, because the adders are offset by full increments of four bit groups.

Figure 3:
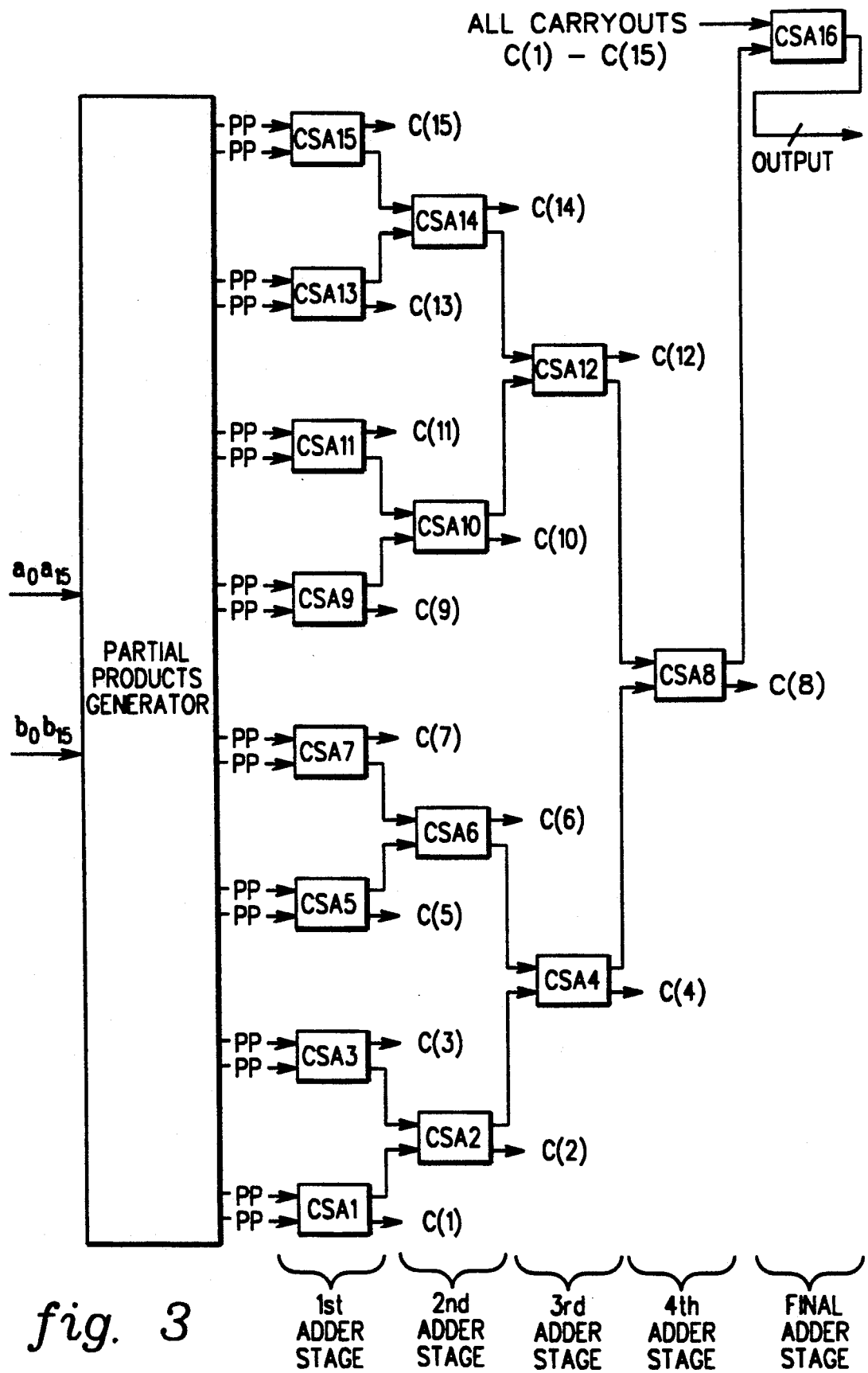
FIG. 3 is a block diagram of an array multiplication circuit pursuant to the present invention wherein multiple carry select adders (CSA) are connected in a hierarchical tree structure.
Figure 4:
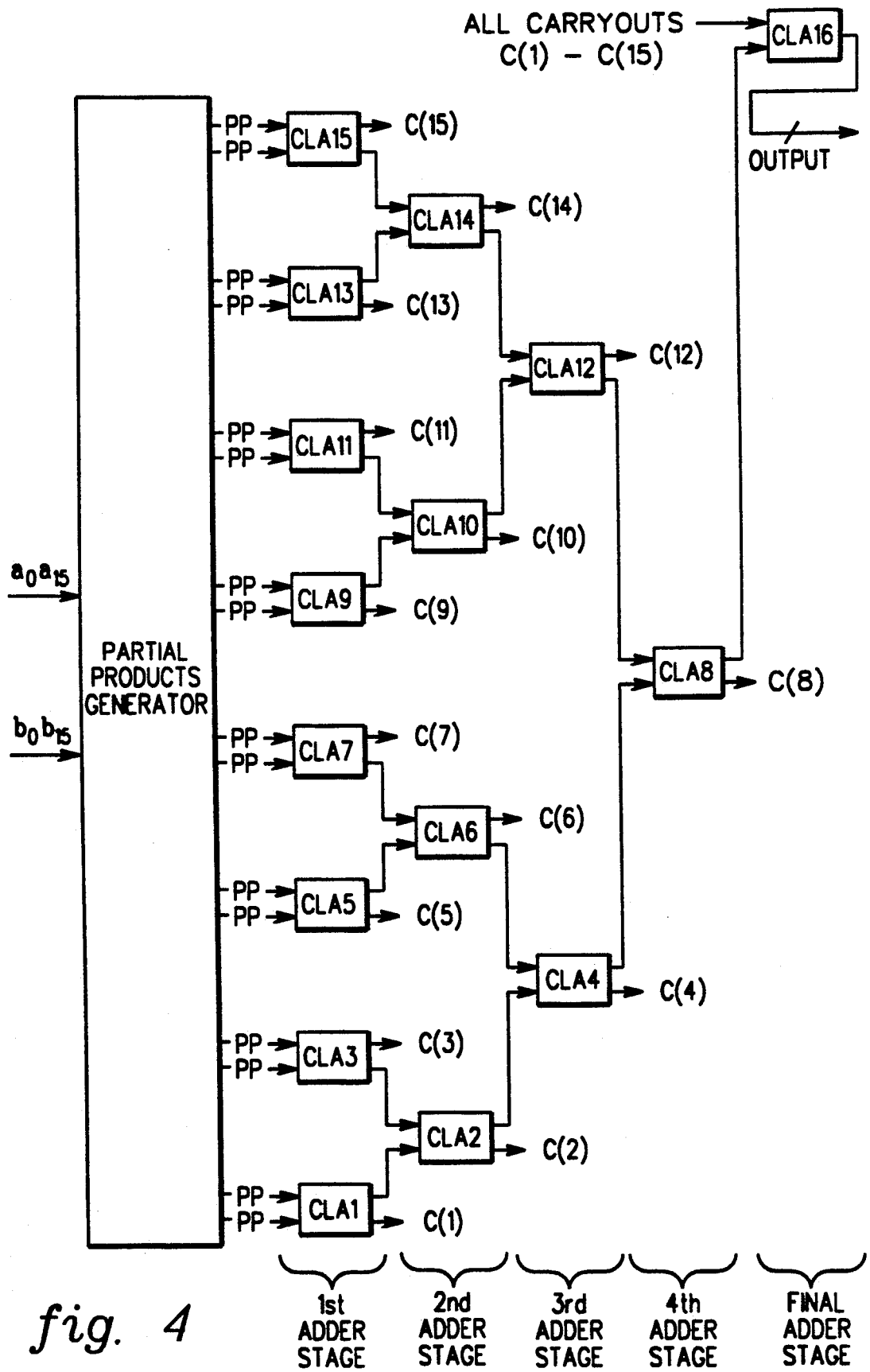
FIG. 4 is a block diagram of an array multiplication circuit pursuant to the present invention wherein multiple carry look-ahead adders (CLA) are connected in a hierarchical tree structure.

As already noted, in a preferred embodiment each carry adder of an array multiplication circuit pursuant to the present invention comprises a carry select adder (CSA) or a carry look-ahead adder (CLA). In FIG. 3, the 16×16 multiplier of FIG. 1 is qualified such that each carry adder in the hierarchical tree structure comprises a carry select adder (CSA). The connections and operations of this multiplication circuit would be essentially as described above. FIG. 4 depicts a multiplication circuit wherein each carry adder of the hierarchical tree structure comprises a carry look-aheadadder (CLA) pursuant to another preferred embodiment of the present invention. As with FIG. 3, the connections and operation of the multiplication circuit of FIG. 4 would be substantially identical to that described above in connection with FIGS. 1 and 2.

To restate, a multiplier circuit pursuant to the present invention consists of a simple hierarchical arrangement of adders suitable for automated design and readily constituted in the form of an integrated circuit. The multiplier can be built with two building blocks: (1) a novel adder circuit; and (2) a two-word partial products generator. Preferably, each adder of the adder circuit comprises a carry select adder or a carry look-ahead adder. A multiplier circuit pursuant to the present invention is as fast as a full Wallace tree multiplier, but must simpler in design, to construct, and to diagnose.

Although a specific embodiment of the present invention has been illustrated in the accompanying drawings and described in the foregoing detailed description, it will be understood that the invention is not limited to the particular embodiment described herein, but is capable of numerous rearrangements, modifications and substitutions without departing from the scope of the invention. The following claims are intended to encompass all such modifications.

I claim:
1. A multiplier circuit comprising:
   a plurality of adders connected in a binary tree structure to complete multiplication of an M bit multiplicand (wherein M is an integer) and an N bit multiplier (wherein N=i, i being an integer) given partial products thereof, each adder of said plurality of adders having a number of bits equal to the number of bits M in the M bit multiplicand, and the number of adders in said binary tree structure being equal to the number of bits N in the N bit multiplier, multiple adder stages being defined by said binary tree structure, each adder of said plurality of adders outputting a sum and a carry;
   a first adder stage of said multiple adder stages of said plurality of adders receiving pairs of partial products of said M bit multiplicand and said N bit multiplier, each adder of said first adder stage receiving partial product pairings such that the partial products are offset one bit position; and
   a final adder stage of said multiple adder stages of said plurality of adders, said final adder stage being coupled to said first adder stage and connected to receive the carrys of all adders of said first adder stage, the sum and the carry of said final adder stage comprising a portion of the product resulting from multiplication of said M bit multiplicand and said N bit multiplier.

2. The multiplier circuit of claim 1, wherein a bit of a sum output by one adder of said first adder stage comprises a portion of the product resulting from multiplication of said M bit multiplicand and said N bit multiplier.

3. The multiplier circuit of claim 1, further comprising a partial products generator for producing said given partial products of said M bit multiplicand and said N bit multiplier.

4. The multiplier circuit of claim 3, further comprising a second adder stage comprising one of said multiple adder stages, said second adder stage being connected to said first adder stage such that each adder of said second adder stage receives sums from two corresponding adders of said first adder stage, said sums received by each adder of said second adder stage being offset two bit positions, and wherein at least two of said adders in said second adder stage also receive an uncollected partial product from said partial products generator, said final adder stage being coupled to said second adder stage and connected to receive the carrys of all adders of said second adder stage.

5. The multiplier circuit of claim 4, wherein two bits of said product resulting from multiplication of said M bit multiplicand and said N bit multiplier are produced by said second adder stage.

6. The multiplier circuit of claim 4, further comprising a third adder stage comprising one of said multiple adder stages, said third adder stage being connected to said second adder stage such that each adder of said third adder stage receives sums from two corresponding adders of said second adder stage, said sums received by each adder of said third adder stage being offset four bit positions, and wherein at least one of said adders in said third adder stage also receives an uncollected partial product of said M bit multiplicand and said N bit multiplier, said final adder stage being coupled to said third adder stage and connected to receive the carrys of all adders of said third adder stage.

7. The multiplier circuit of claim 6, wherein an adder of said third adder stage outputs four bits of said product resulting from multiplication of said M bit multiplicand and said N bit multiplier.

8. The multiplier circuit of claim 6, further comprising a fourth adder stage comprising one of said multiple adder stages, said fourth adder stage being connected to said third adder stage such that each adder of said fourth adder stage receives sums from two corresponding adders of said third adder stage, said sums received by each adder of said fourth adder stage being offset eight bit positions, said fourth adder stage receiving an uncollected partial product of said M bit multiplicand and said N bit multiplier, said final adder stage being coupled to said fourth adder stage and connected to receive the carrys of all adders of said fourth adder stage.

9. The multiplier circuit of claim 8, wherein an adder of said fourth adder stage outputs eight bits of the product resulting from multiplication of said M bit multiplicand and said N bit multiplier.

10. The multiplier circuit of claim 8, wherein the number of bits M in the M bit bit multiplicand equals the number of bits N in the N bit multiplier, and wherein $M = N = 16$.

11. The multiplier circuit of claim 1, wherein each of said adders of said plurality of adders comprises one of a carry select adder and a carry look-ahead adder.

12. A binary multiplier circuit for determining a product of an M bit multiplicand (wherein M is an integer) and an N bit multiplier (wherein $N = 4i$, i being an integer) given partial products thereof, said binary multiplier circuit comprising:

a plurality of adders connected in a binary tree configuration to complete multiplication of said M bit multiplicand and said N bit multiplier based on said partial products, said plurality of adders connected in said binary tree configuration having a plurality of adder stages, each adder of said plurality of adders outputting a sum and a carry;

a first adder stage of said plurality of adder stages collecting pairs of partial products of said M bit multiplicand and said N bit multiplier offset one bit position;

a second adder stage of said plurality of adder stages connected to said first adder stage such that each adder of said second adder stage receives sums from two corresponding adders of said first adder stage, said sums received by each adder of said second adder stage being offset two bit positions, and wherein at least two of said adders of said second adder stage also receive an uncollected partial product of said M bit multiplicand and said N bit multiplier for combining with received sums; and a final adder stage coupled to said first adder stage and said second adder stage, said final adder stage outputting a portion o the product of said M bit multiplicand and said N bit multiplier.

13. The multiplier circuit of claim 12, wherein an adder of said first adder stage outputs one bit of the product resulting from multiplication of said M bit multiplicand and said N bit multiplier, and wherein an adder of said second stage outputs two bits of the product resulting from multiplication of said M bit multiplicand and said N bit multiplier.

14. The multiplier circuit of claim 12, further comprising a third adder stage comprising one of said plurality of adder stages, said third adder stage being connected to said second adder stage such that each adder of said third adder stage receives sums from two corresponding adders of said second adder stage, said sums received by each adder of said third adder stage being offset four bit positions, and wherein at least one of said adders of said third adder stage also receives an uncollected partial product of said M bit multiplicand and said N bit multiplier, said final adder stage being coupled to said third adder stage.

15. The multiplier circuit of claim 14, wherein said third adder stage outputs four bits of said product resulting from multiplication of said M bit multiplicand and said N bit multiplier.

16. The multiplier circuit of claim 14, further comprising a fourth adder stage comprising one of said plurality of adder stages, said fourth adder stage being connected to said third adder stage such that each adder of said fourth adder stage receives sums from two corresponding adders of said third adder stage, said sums received by each adder of said fourth adder stage being offset eight bit positions, and wherein at least one adder of said fourth adder stage also receives an uncollected partial product of said M bit multiplicand and said N bit multiplier, said final adder stage being coupled to said fourth adder stage.

17. The multiplier circuit of claim 16, wherein said fourth adder stage outputs eight bits of said product resulting from multiplication of said M bit multiplicand and said N bit multiplier.

18. The multiplier circuit of claim 16, wherein the number of bits M in the M bit multiplicand equals the number of bits N in the N bit multiplier, and wherein M=N=16.

19. The multiplier circuit of claim 16, wherein said final adder stage is connected to receive carry from all adders in the first adder stage, second adder stage, third adder stage and fourth adder stage, a sum and a carry output from said final adder stage comprising a portion of the product resulting from multiplication of said M bit multiplicand and said N bit multiplier.

20. A multiplication circuit for high speed multiplication in a computer system, said multiplication circuit comprising:
   a partial products generator having a first input for receiving a binary multiplicand and a second input for receiving a binary multiplier, said partial products generator outputting partial products based on said binary multiplicand and said binary multiplier;
   a carry adder circuit for producing a sum and a carry from said partial products output from said partial products generator, said carry adder circuit including a plurality of carry adders arranged in multiple adder stages and connected in a hierarchical tree structure such that each carry adder stage except a first carry adder stage receives sums from a next adjacent, lower carry adder stage in the hierarchical tree structure, said first carry adder stage receiving most of the partial products output from said partial products generator; and
   wherein each adder within said carry adder circuit comprises one of a carry select adder and a carry look-ahead adder.

21. The multiplication circuit of claim 20, wherein said multiple adder stages include a final adder stage adder connected to receive carrys of all adders in all other stages of the hierarchical tree structure, the sum and the carry of the final adder stage adder comprising a portion of the product resulting from multiplication of said binary multiplicand and said binary multiplier.

22. The multiplication circuit of claim 20, wherein each of said multiple carry adder stages contributes at least one bit to the product resulting from multiplication of said binary multiplicand and said binary multiplier.

23. The multiplication circuit of claim 20, wherein each adder stage of said multiple adder stages receives at least one partial product from said partial products generator.

24. The multiplication circuit of claim 20, wherein a second adder stage comprises one of said multiple adder stages, said second adder stage being connected to said first adder stage such that each adder of said second adder stage receives sums from two corresponding adders of said first adder stage, said sums received by each adder of said second adder stage being offset two bit positions.

25. The multiplication circuit of claim 24, wherein a third carry adder stage comprises one of said multiple adder stages, said third adder stage being connected to said second adder stage such that each adder of said third adder stage receives sums from two corresponding adders of said second adder stage, said sums received by each adder of said third adder stage being offset four bit positions.

26. The multiplication circuit of claim 25, wherein a fourth carry adder stage comprises one of said multiple adder stages, said fourth carry adder stage being connected to said third carry adder stage such that each adder of said fourth adder stage receives sums from two corresponding adders of said third adder stage, said sums received by each adder of said fourth adder stage being offset eight bit positions.

* * * * *

UNITED STATES PATENT AND TRADEMARK OFFICE
CERTIFICATE OF CORRECTION

PATENT NO. : 5,283,755
DATED : Feb. 1, 1994
INVENTOR(S) : Bechade

It is certified that error appears in the above-indentified patent and that said Letters Patent is hereby corrected as shown below:

Column 8, line 34, delete "o" and substitute therefor --of--.
Column 9, line 12, delete "carry" and substitute therefor --carrys--.

Signed and Sealed this

Twenty-eighth Day of June, 1994

Attest:

BRUCE LEHMAN

*Attesting Officer*  *Commissioner of Patents and Trademarks*